United States Patent [19]
Leibowitz

[11] 4,241,984
[45] Dec. 30, 1980

[54] SIMPLIFIED FIELD EFFECT, TWISTED NEMATIC LIQUID CRYSTAL DISPLAY CONSTRUCTION

[75] Inventor: Marshall Leibowitz, Ridgefield, Conn.

[73] Assignee: Timex Corporation, Waterbury, Conn.

[21] Appl. No.: 45,576

[22] Filed: Jun. 4, 1979

[51] Int. Cl.³ .............................................. G02F 1/133
[52] U.S. Cl. ..................... 350/337; 350/341; 350/155
[58] Field of Search ...................... 350/337, 341, 155

[56] References Cited
U.S. PATENT DOCUMENTS

| | | | |
|---|---|---|---|
| 3,426,728 | 2/1969 | Dreyer et al. | 350/155 X |
| 3,459,839 | 8/1969 | Hutfles | 350/155 X |
| 3,731,986 | 5/1973 | Fergason | 350/337 X |
| 3,869,196 | 3/1975 | Kubota | 350/337 |

*Primary Examiner*—Edward S. Bauer
*Attorney, Agent, or Firm*—Edward J. Timmer

[57] ABSTRACT

An untreated polarizer layer which inherently exhibits liquid crystal alignment-promoting characteristics is placed on an untreated front and/or rear substrate and respective electrode layer in contact with the liquid crystal so that the polarizer layer can serve the dual function of polarizing and liquid crystal alignment means in the display, thereby simplifying display construction. If desired, the polarizer layer itself may be rubbed or otherwise mechanically treated in situ on the substrate to selectively alter its liquid crystal alignment properties. Further simplification of the display is achieved by combining the rear electrode, associated rear polarizer and liquid crystal alignment means, and reflector together in the form of a reflective metallic electrode member having a transparent, dual functioning polarizer-alignment layer on the inner surface adjacent and in contact with the liquid crystal layer of the display. A reduction in the number of layers in the display sandwich from ten to only seven is possible with the invention. A novel polarizer-alignment layer useful in simplifying the display construction is made of cyanoethylated polyvinyl alcohol or butyrate.

21 Claims, 5 Drawing Figures

VIEWER (A)

VIEWER (A)

SIMPLIFIED FIELD EFFECT, TWISTED NEMATIC LIQUID CRYSTAL DISPLAY CONSTRUCTION

FIELD OF THE INVENTION

The present invention relates to electro-optical displays and, more particularly, to those of the field effect, twisted nematic liquid crystal type having a simplified sandwich construction.

DESCRIPTION OF THE PRIOR ART

A liquid crystal display of the field effect, twisted nematic type can be generally obtained by interposing a nematic liquid crystal compound or mixture having positive dielectric anisotropy between a spaced front and rear electrode and associated liquid crystal alignment means. Typically, the display is constructed using spaced glass substrates, the front substrate carrying one or more transparent electrode layers, e.g. tin oxide, patterned to define numerals, letters or other display information and the rear substrate carrying one or more rear electrodes. In twisted nematic displays, the substrates have alignment means associated therewith at the interface with the liquid crystal to impart optical rotary power to the liquid crystal by arranging its molecules initially in a helical pattern parallel to the substrates. This helical pattern is controlled or realigned by the application of a suitable electric field between the front and rear electrodes to vary the optical rotation through the liquid crystal layer. By this variation in optical rotation and with the aid of crossed polarizer layers associated with the front and rear electrodes, the twisted nematic liquid crystal display can be used to display information.

In the past, the alignment means associated with the electrodes of the display have taken several forms. One known means for imparting the initial helical alignment to the liquid crystal has been to rub the glass substrate in one direction with a cloth or other material after the electrode layes have been applied and then to place the substrates in spaced apart relation with the direction of rubbing on one substrate being perpendicular to that on the other. Thin layers or films of material such as polyimide resin have also been applied to the substrates and rubbed to impart alignment characteristics thereto as shown in the Toida U.S. Pat. No. 4,068,923 issued Jan. 17, 1978. According to another method, the substrates are rubbed as described above and subsequently a layer of dichroic dye is applied onto the rubbed surface and dried so that a film having alignment as well as polarizing characteristics is formed; e.g. see the Fergason U.S. Pat. No. 3,731,986 issued on May 8, 1973. In still another technique known as the slope evaporation method, the substrates are placed at an inclined orientation relative to a source of inorganic material such as silicon oxide and a layer of material is deposited on the substrates by vapor deposition at a preselected orientation, the deposited layer forming an alignment film.

Further, it is known that certain nematic liquid crystal materials exhibit polarizing characteristics on their own and that such a nematic material can be solidified on a substrate in the presence of an orienting field generated by rubbing, brushing, stretching or applying an electric or magnetic field to form a solid, permanently oriented polarizer film, e.g. as described in the Dryer U.S. Pat. No. 2,400,877 issued May 28, 1946. However, commercial twisted nematic liquid crystal displays have used external sheets of polarizing material adjacent the exterior surfaces of the substrates out of contact with the liquid crystal material.

These liquid crystal displays can be used in the reflective and/or transmissive mode. If the reflective mode is used, a reflector of for example metallic foil is placed behind and adjacent the rear polarizer layer of the display. On the other hand, it is sometimes necessary to operate the display in both modes, for example, in digital watch displays having day and night time viewing capability and to this end a so-called transflector is used in lieu of the reflector to not only reflect incident ambient light during day time operation but also to transmit light from a light source behind the display for night time viewing. The transflector typically may comprise a transluscent or frosted glass or plastic sheet and/or a thin metallic layer or deposit.

In the past, prior art workers have recognized the desirability of simplifying the structure of twisted nematic liquid crystal displays to reduce the number of components in the sandwich construction and thereby reduce the thickness and overall cost of the display. The present invention has as one of its important objects such a simplification in display construction.

SUMMARY OF THE INVENTION

In accordance with one embodiment of the invention, the structure of a field effect, twisted nematic liquid crystal display is simplified by positioning an untreated polarizer layer which inherently exhibits liquid crystal alignment promoting properties on an untreated front and/or rear substrate and respective electrode layer in contact with the liquid crystal so that the layer serves the dual function of polarizer and liquid crystal alignment means in the display. This embodiment finds its basis in the unexpected discovery that many polarizer films or layers inherently exhibit the ability to promote alignment in the liquid crystal layer when brought into contact therewith with the liquid crystal alignment-promoting direction of the untreated layer corresponding generally to the polarizing axis thereof. In this regard, the utilization of an untreated polarizer layer on an untreated substrate and associated electrode layer additionally as liquid crystal alignment means has been completely unforeseen by prior art workers which heretofore have required rubbing or other treating of the substrate and electrode layer to impart liquid crystal alignment-promoting properties to a polarizer layer formed thereon.

In another embodiment, a polarizer layer disposed on the inside surface of one or both of the substrates is itself rubbed or otherwise treated in situ on the substrate to artifically alter its liquid crystal alignment properties. For example, this embodiment might be used in the situation where the liquid cyrstal alignment directions of the front and rear polarizer layers are to be oriented at other than 90° with respect to one another to preferentially form the liquid crystal helix in one direction and thereby minimize certain undesired optical effects.

In yet another embodiment of the invention, the structure of the display is simplified by combining the rear electrode, associated rear polarizer and alignment means, and reflector (or transflector) together in the form of a reflective metallic electrode member having a thin transparent polarizer-alignment layer on the inside surface adjacent and in contact with the liquid crystal layer of the display. Preferably, the reflective electrode member comprises metallic foil while the polarizer-alignment layer is similar to those described in the above embodiments and is bonded or deposited on the metallic foil.

In the above embodiments, a novel polarizer-alignment layer or film comprises cyanoethylated polyvinyl alcohol or cyanoethylated polyvinyl butyrate each of which has a very high dielectric constant.

BRIEF DESCRIPTION OF THE DRAWINGS

These and other advantages and objects of the present invention will be more fully understood by reference to the following detailed description taken with the drawings in which.

DESCRIPTION OF THE PREFERRED EMBODIMENTS

Figure 1:
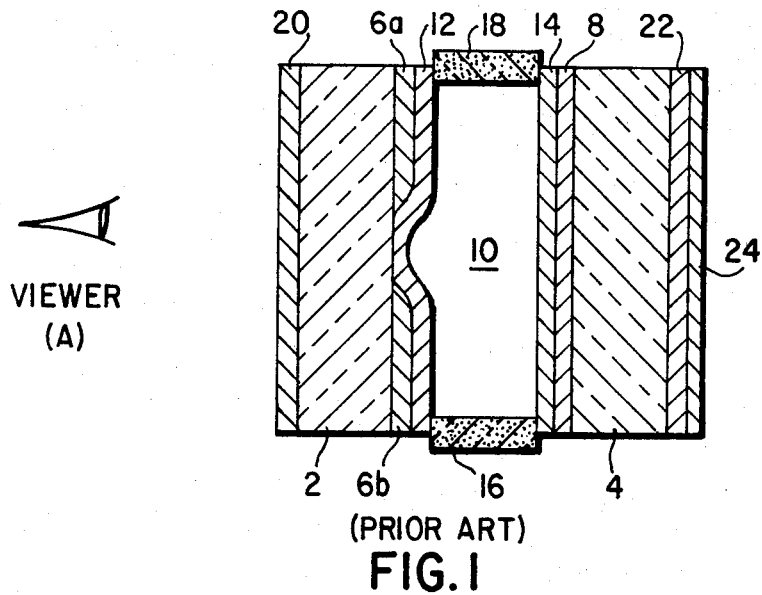
FIG. 1 is a cross-sectional view of a typical prior art twisted nematic liquid crystal display.

A typical prior art twisted nematic liquid crystal display is illustrated in FIG. 1 and includes front and rear glass or other transparent substrates 2 and 4 having conductive electrodes 6a and b and 8 of, for example, tin oxide thereon. Typically, the front electrode is segmented in a particular pattern such as numerals, letters or other symbols to display information while the rear electrode may be provided in the form of unsegmented layer 8 as shown. With this type of unsegmented rear electrode, it is necessary that the lead lines (not shown) connecting the front electrode segments to a voltage source be masked with suitable insulation to prevent unwanted optical activation of the liquid cyrstal layer or formed with a sufficiently narrow width that any optical effect produced in the liquid crystal is not visible to the unaided eye of viewer A; e.g. see the Garber U.S. patent application Ser. No. 942,726 filed Sept. 15, 1978 entitled "Simplified Liquid Crystal Display And Method For Making Same" of common assignee herewith. On the other hand, as shown in the Harsch U.S. Pat. No. 3,857,627, the rear electrode may be patterned similarly to the front electrode with the front and rear segments being aligned to avoid any overlap of lead lines with the electrodes and thereby prevent unwanted activation of the liquid crystal layer. Vapor deposited or otherwise applied onto the electrodes 6 and 8 are thin alignment layers 12 and 14, for example, 0.05 micron silicon oxide films vacuum deposited at a preselected angle. Spacing of the front and rear substrates a prescribed distance apart and sealing of the liquid crystal layer there-between is achieved by epoxy or glass frit spacers 16 and 18 disposed around the periphery of the substrates. Polarizer layers 20 and 22 are positioned on the outside surfaces of substrates 2 and 4, respectively, with their polarizing axes oriented at 90° with respect to one another in well-known fashion. Typical polarizer films heretofore used comprise 2 mil layers of polyvinyl alcohol bonded to a butyrate protective layer. Finally, a reflector 24 such as aluminum foil is disposed behind the rear substrate 4 and polarizer layer 22 to reflect incident ambient light. As used herein, "reflector" is intended to also include transflectors which were described hereinabove with respect to displays having both day and night-time viewability. Of course, electrodes 6 and 8 are connected to suitable and well-known electrical circuitry (not shown) to generate an electric field across the liquid crystal layer 10 to selectively alter its optical rotary power.

Figure 2:
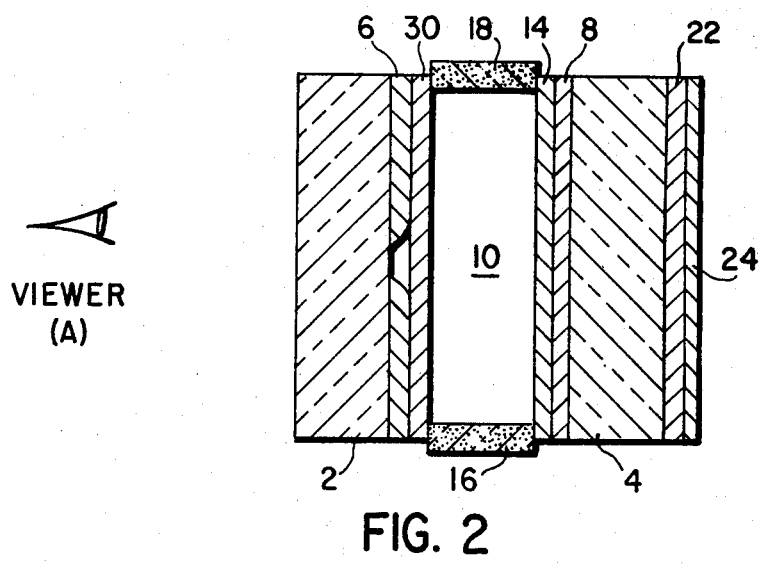
FIG. 2 is a cross-sectional view of a liquid crystal display of the invention with a preformed polarizer-alignment film on the inside of the front substrate.

FIG. 2 (wherein like numerals represent like features) illustrates one embodiment of the invention characterized by the placement of untreated polarizer layer 30 on electrode segments 6a and b in contact with the liquid crystal layer 10 so that the layer not only functions as polarizing means in the display but also as liquid crystal alignment means by viture of its own inherent ability to promote preferential molecular alignment in the liquid crystal when brought into contact therewith with the liquid crystal alignment-promoting direction of the untreated polarizer layer 30 corresponding to its polarizing axis. It is important to note that no rubbing or other physical treatment to substrate 2, electrode segments 6a and b or the polarizer layer 30 is necessary in order that this dual function is achieved with the polarizer layer. Although not wishing to be bound by theory, it is believed that the untreated polarizer layer exhibits liquid crystal alignment capabilities as a result of its inherently oriented molecular structure which through Van der Waals forces influences the liquid crystal molecules adjacent thereto. Whatever the explanation behind the effect, it is apparent that the use of an untreated polarizer layer on an untreated substrate/electrode also for liquid crystal alignment purposes in the display has been completely unforeseen by the prior art teachings which require some type of mechanical treatment to the substrate and electrode layer for imparting artificial orientation to a polarizer layer thereon for liquid crystal alignment purposes.

Polarizer films exhibiting the inherent ability to also function as liquid crystal alignment means in the untreated condition in the display are available commercially, for example, under the designation XA Transfer Film from Marks Polarized Corp. This polarizer film comprises a 4-8 micron layer of iodine-treated, oriented polyvinyl butyrate and can be purchased in large sheet form and then cut to size to fit over the front substrate and electrode segments thereon, the film being bonded thereto by various means such as thermal bonding. As already discussed, no further treatment of the as-cut polarizer-alignment film is required. A polarizer film made from XA Transfer Film with a thickness of 4 microns has been utilized on the front substrate and electrode segments as illustrated in FIG. 2 and, in conjunction with a Si O alignment layer and standard outside polarizer on the rear substrate, produced excellent twisted nematic (helical) orientation in the liquid crystal layer and excellent overall display appearance. Operating voltage was about 6 volts. The thickness of the polarizer layer 30 is an important consideration in the invention as a means of reducing the required operating voltage and assuring acceptable switching speed. To this end, the polarizer film is used in preferred thicknesses of less than 6 microns, preferably less than 4 microns.

Another preferred polarizer-alignment film or layer useful in the invention is cyanoethylated polyvinyl alcohol or cyanoethylated polyvinyl butyrate as a result of their very high dielectric constants, e.g. a dielectric constant on the order of 25-30 at 10 micron thickness as opposed to about 8 for uncyanoethylated polyvinyl alcohol or butyrate at the same thickness. With cyanoethylated polyvinyl alcohol or butyrate, the voltage drop across the polarizer layers would thus be significantly less and the necessary driving voltage for the display would not be much different from that for a display with exterior polarizers. The cyanoethylated forms of polyvinyl alcohol or butyrate are available from Poly Sciences Corporation.

Of course, rather than being used as a preformed, precut film, the polarizer-alignment layer 30 may be formed in situ on the untreated substrate 2 and electrode segments 6a and b. For example, one technique which might be employed is to directionally dip-coat the untreated substrate-electrode segments in liquid dichroic material so that the as-applied coating incorporates the molecular orientation necessary for the polarizing as well as liquid crystal alignment functions and retains the orientation after solidification. The dip-coated layer would function as a polarizer-alignment layer 30 after solidification without any further treatments and without the substrate and/or electrode segments being mechanically treated by rubbing, etc.

Figure 3:
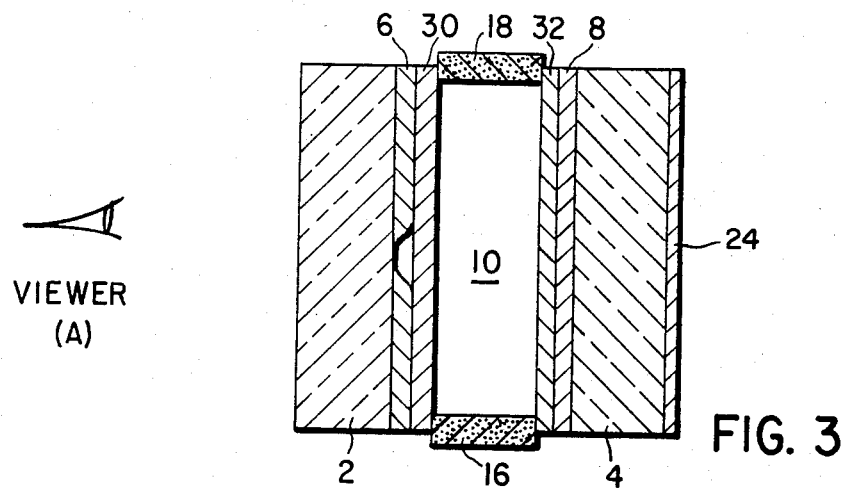
FIG. 3 is similar to FIG. 2 with the addition of a polarizer-alignment film on the inside of the rear substrate.

FIG. 3 illustrates another embodiment of the invention wherein like numerals represent like features. In this figure, the structure of the display is considerably simplified by utilizing, in addition to the preformed polarizer-alignment film 30 on the front substrate 2, a preformed polarizer-alignment film 32 on the rear substrate 4 and electrode 8. Of course, the polarizer-alignment films 30 and 32 could also be formed in situ on each substrate by the directional dip-coating technique already discussed. It is apparent from a comparison of FIGS. 1 and 3 that the structure of the display has been simplified by reducing the number of layers in the display sandwich from ten in FIG. 1 to only eight in FIG. 3.

Notwithstanding the above embodiments in which no rubbing of the substrate and electrode layer is required to enable the polarizer layer to function as liquid crystal alignment means, there may be circumstances in which it is desirable to treat the polarizer layer itself in situ on the substrate to artificially alter its liquid crystal alignment direction or axis. For example, in the event that the liquid crystal alignment axes of the front and rear polarizer layers 30 and 32 of FIG. 3 are to be oriented at other than 90°, for example 88°, with respect to one another to preferentially orient the liquid crystal helix in one direction so as to minimize reverse tilt effects, it may be most convenient according to another embodiment of the invention to simply apply the aforementioned polarizer layers to the substrate with their polarizing axes in crossed (90°) relation and then to rub or otherwise treat their surfaces to artificially alter their liquid crystal alignment directions at the preselected nonorthogonal angle, e.g. 88°. This mechanical treatment of the polarizer layers after application to the substrate and independent of their polarizing axes is an advantageous and novel means for optimizing the structure and performance of the display. This embodiment is useful whether one (FIG. 2) or both (FIG. 3) of the polarizer layers are inside the display in contact with the liquid crystal layer. The polarizer layers may be of the preformed type bonded to the substrate or of the formed-in-place type, e.g. directionally dipcoated substrates, or a combination thereof.

Figure 4:
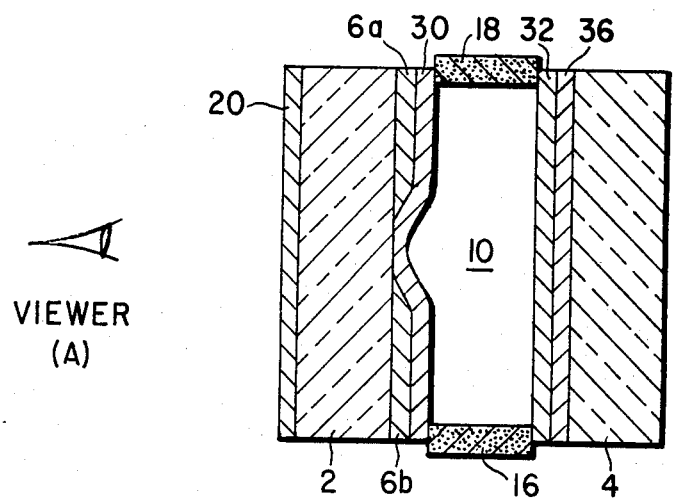
FIG. 4 is a cross-sectional view of an inventive liquid crystal display which includes a simplified rear electrode, polarizer-alignment layer and reflector structure.
Figure 5:
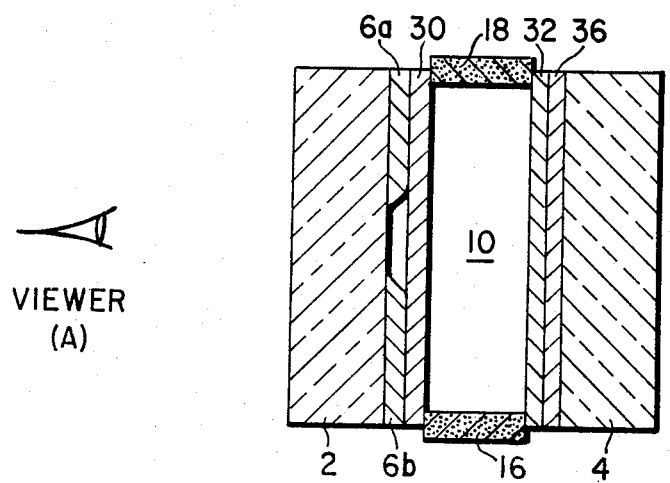
FIG. 5 is similar to FIG. 4 with the addition of a polarizer-alignment layer on the inside of the front substrate.

FIGS. 4 and 5 illustrate still another embodiment of the invention in which the structure of the field effect, twisted nematic display is simplified by combining the rear electrode, associated rear polarizer and liquid crystal alignment means, and reflector together in the form of a reflective metallic electrode member 36 having a transparent polarizer-alignment layer 32 on the inner surface adjacent and in contact with the liquid crystal layer of the display. More specifically, substrate 4 has adhered to its inner surface a reflective metallic rear electrode such as preferably metallic foil, e.g. aluminum foil, which in conjunction with the front electrode segments 6a and b are activated by a conventional voltage source to generate an electric field across the liquid crystal layer 10 for display purposes. Of course, the reflective electrode member 36 may be unsegmented as shown in FIGS. 4 and 5 with the lead lines insulated or it may be patterned complementary to the front electrode segments to avoid lead line overlap. The reflective electrode member 36 also serves to reflect any incident ambient light in the display and for this purpose may be adhered to a suitably etched inner surface on the substrate 4. Bonded or deposited atop the reflector-electrode member is polarizer-alignment layer 32 like those already referred to and described hereinabove. For example, the polarizer-alignment layer could be a preformed polarizer film or a polarizer layer deposited by directional dip-coating with or without its surface being mechanically treated to artificially alter the liquid crystal alignment direction. In FIG. 4, the front polarizer layer 20 is outside the display in conventional prior art fashion whereas in FIG. 5 the front polarizer 30 is disposed on the inside of the display and also functions as liquid crystal alignment means as described hereinabove.

It is apparent from a comparison of FIGS. 1, 4 and 5 that the structure of the display has been simplified by reducing the number of layers in the sandwich construction from ten in FIG. 1 to eight in FIG. 4 and only seven in FIG. 5.

If desired, the reflective metallic rear electrode 36 can be made to function as a transflector by using a partially aluminized or silvered plastic layer. The rear electrode can be conveniently applied to the substrate by vacuum vapor disposition or similar techniques. On the other hand, if the display is to operate only in the reflective mode, it may be possible to increase the thickness of the rear reflector-electrode member 36 and dispense with substrate 4 altogether, thereby further eliminating an additional layer from the sandwich construction.

While the invention has been explained by a detailed description of certain preferred embodiments, it is to be understood that various modifications and substitutions can be made in any of them within the scope of the appended claims which are intended to also include equivalents of such embodiments.

I claim:

1. In a liquid crystal display of the field effect, twisted nematic type, the improvement for simplifying the display construction comprising:

an untreated substrate and associated electrode layer having an untreated polarizer layer which inherently exhibits liquid crystal alignment-promoting characteristics positioned thereon in contact with the liquid crystal so that said polarizer layer serves the dual function of polarizing and liquid crystal alignment means in the display.

2. The display of claim 1 wherein the polarizer layer comprises a preformed polarizer film adhered to said substrate.

3. The display of claim 1 wherein the polarizer layer is formed in situ on the substrate.

4. The display of claim 3 wherein the polarizer layer is directionally dip-coated on the substrate.

5. The display of claim 1 wherein the polarizer layer comprises a film of iodine-treated oriented polyvinyl butyrate.

6. The display of claim 1 wherein the polarizer layer comprises cyanoethylated polyvinyl alcohol or cyanoethylated polyvinyl butyrate.

7. The display of claim 1 wherein the polarizer layer has a thickness of about 6 microns or less.

8. In a liquid crystal display of the field effect, twisted nematic type, the improvement for simplifying the display structure comprising:

an untreated substrate and associated electrode layer having a treated polarizer layer thereon in contact with the liquid crystal, the polarizer layer being treated in situ on said substrate and electrode layer to impart a preselected artificial liquid crystal alignment-promoting orientation thereto so that said polarizer layer serves the dual function of polarizing and liquid crystal alignment means in the display.

9. The display of claim 8 wherein the polarizer layer is treated by rubbing.

10. The display of claim 8 wherein the polarizer layer is treated to have a liquid crystal alignment direction different from its polarizing axis.

11. The display of claim 8 wherein the polarizer layer comprises cyanoethylated polyvinyl alcohol or cyanoethylated polyvinyl butyrate.

12. In a twisted nematic liquid crystal display having a nematic liquid crystal layer disposed between spaced front and rear electrodes each having polarizer and liquid crystal alignment means associated therewith, the rear electrode also having a reflector located adjacent thereto the improvement comprising:

a rear electrode, associated rear polarizer and alignment means, and reflector combined together in the form of a reflective metallic electrode member having a transparent polarizer-alignment layer on the untreated surface facing said front substrate and in contact with the liquid crystal layer.

13. The display of claim 12 wherein the reflective metallic electrode member is metal foil.

14. The display of claim 13 wherein the metallic foil is aluminum foil.

15. The display of claim 12 wherein the polarizer-alignment layer comprises a preformed polarizer film bonded to the respective substrate/electrode layer.

16. The display of claim 12 wherein the reflective metallic electrode member is a metallized plastic layer.

17. A liquid crystal display of the field effect, twisted nematic type, comprising:
   (a) an intermediate layer of liquid crystal material;
   (b) untreated front and rear substrates and associated electrode layers positioned on opposite sides of the liquid crystal layer, each said substrate and associated electroce layer having an untreated polarizer layer which inherently exhibits liquid crystal alignment-promoting characteristics positioned thereon in contact with said sides of the liquid crystal layer so that each polarizer layer serves the dual dunction of polarizing and liquid crystal alignment means in the display.

18. The display of claim 17 wherein the rear substrate includes a reflective electrode layer with said untreated polarizer-alignment layer thereon in contact with the rear side of the liquid crystal layer.

19. A liquid crystal display of the field effect, twisted nematic type, comprising:
   (a) an intermediate layer of liquid crystal material;
   (b) untreated front and rear substrates and associated electrode layers positioned on opposite sides of the liquid crystal layer, each said substrate and associated electrode layer having a treated polarizer layer thereon in contact with said sides of the liquid crystal layer, each polarizer layer being treated in situ on its respective substrate and electrode layer to impart a preselected artificial liquid crystal alignment-promoting orientation thereto so that each serves the dual function of polarizing and liquid crystal alignment means in the display.

20. The display of claim 19 wherein the rear substrate includes a refelective electrode layer with said treated polarizer-alignment layer thereon in contact with the rear side of the liquid crystal layer.

21. In a liquid crystal display of the field effect, twisted nematic type, the improvement for simplifying the display construction comprising;

an untreated substrate and associated electrode layer having a polarizer-liquid crystal alignment layer made from cyanoethylated polyvinyl alcohol or cyanoethylated polyvinyl butyrate thereon in contact with the liquid crystal.

* * * * *